United States Patent Office 3,016,480
Patented Jan. 9, 1962

3,016,480
ARTICLES CONTAINING FLUOALUMINATES AS DIELECTRICS
Isadore Mockrin, Plymouth Meeting, Pa., assignor to Pennsalt Chemicals Corporation, Philadelphia, Pa., a corporation of Pennsylvania
No Drawing. Filed June 29, 1960, Ser. No. 39,726
5 Claims. (Cl. 317—230)

This invention relates to the use of certain fluoaluminates as novel dielectric materials. More particularly, the invention deals with the use of potassium and rubidium tetrafluoaluminates as solid dielectrics.

A dielectric or insulating material may be characterized roughly as having an electrical conductivity less than $10^{-6}$ mhos./cm. Important dielectrics include mica, barium titanate, various ceramics, paper and impregnated papers, numerous plastics and the like. Muscovite, $K_4Al_{12}Si_{12}O_{40}(OH)_8$, and phlogopite, $$K_4Mg_{12}Al_4Si_{12}O_{40}(OH)_8$$

are the two natural forms of mica used as dielectrics. Synthetic mica, phlogopite in which F has replaced the OH group, is also used to some extent. Such characteristics as high dielectric strength, low power-factor losses, flexibility, transparency and perfect cleavage make mica usable in many industries.

Sheet mica is a vital material both in peace and wartime for the electronic and electrical industries. Unfortunately, the United States has been virtually dependent on foreign sources for high-quality sheet mica. India is the principal source of muscovite sheet mica. Brazil is also an important exporter of high-quality muscovite block to the United States. The United States supply of phlogopite is obtained almost entirely from Madagascar and Canada.

Research on synthetic mica, or fluorine-phlogopite, has resulted in a commercially feasible method for manufacture, but only relatively small crystals are generally obtained, so that synthetic mica is not a substitute for sheet mica. However, it is used in such applications as glass-bonded mica ceramics and hot-pressed machinable dielectrics (see for example, the disclosure of U.S. 2,675,853). Thus, there still remains the need for a readily available sheet dielectric material.

It has now been found, according to this invention, that potassium and rubidium tetrafluoaluminates (e.g. $KAlF_4$ and $RbAlF_4$) are excellent solid dielectric materials which may be obtained in a layer structure form providing cleavable sheets similar to natural mica. Only these two alkali metal tetrafluoaluminates can be cleaved readily into thin sheets and so become useful as dielectrics. Cesium tetrafluoaluminate, for example, is not a sheet-like material and thus does not lend itself to dielectric applications. $NaAlF_4$ and $LiAlF_4$, on the other hand, are not stable at room temperature and their preparation requires a vapor phase reaction at very high temperatures which is most difficult.

The dielectrics of this invention are readily obtained by slowly cooling a melt of the tetrafluoaluminate and allowing the sheet-like crystals to form. No elaborate controls are required; it is merely necessary to fuse the potassium or rubidium tetrafluoaluminate and allow slow cooling to room temperature to occur. The resulting material consists of "books" of large sheet-like crystals which are ready for use. The fluoaluminate compositions are prepared readily according to the method of Brosset (Z. Anorg. Chem. 235, 139–147 (1937) and 239, 301–304 (1938)) which involves simply the evaporation to dryness of an aqueous hydrogen fluoride solution of a hydrated alumina (e.g. gibbsite) and an alkali metal (i.e. potassium or rubidium) fluoride. Fusion at about 600° to 700° C. and slow cooling of the mass yields the crystalline solid dielectric.

The following examples illustrate procedures for preparing these fluoaluminates:

EXAMPLE 1

A solution of 312 grams of $Al_2O_3 \cdot 3H_2O$ (2.0 moles) and 379 grams of $KF \cdot 2H_2O$ (4.0 moles) containing 510 ml. 48% aqueous hydrogen fluoride was evaporated to dryness to yield a white powder. Then, 152.7 grams of this powder was placed in a platinum dish and fused at 650° C. in a muffle furnace for one hour. The temperature was reduced rapidly to 600° C. and then reduced to 560° C. over a period of one and one-half hours. A weight loss of 0.9 gram was sustained, apparently due to loss of residual water and hydrogen fluoride. The solidified melt contained large transparent crystals of potassium tetrafluoaluminate (largest about one inch square). Then, 196.5 grams of $KAlF_4$ powder was added to the fusion product in two steps and fusion and cooling repeated. This separate addition was made because of the large decrease in volume upon fusion. A "book" of large sheet crystals about 2 inches by ¾ inch was formed as well as smaller sheets. Fusion and cooling were done in a dry nitrogen atmosphere.

"Books" of rubidium tetrafluoaluminate were prepared in the same manner.

EXAMPLE 2

A mass of $KAlF_4$ in a 250 ml. platinum dish was fused at 650° C. for 1.5 hours and then cooled to 600° C. Subsequent cooling from 600° C. to 532° C. was done at a rate of approximately 1° C. per minute. Then, the melt was allowed to cool to room temperature overnight after which time the solidified melt contained large transparent sheets. Crystals were separated into three parts: (1) large surface crystals, (2) a matrix of transparent sheets and (3) a matrix of opaque sheets. All three types of crystals were confirmed as $KAlF_4$ by X-ray powder patterns.

EXAMPLE 3

$RbAlF_4$ was prepared according to the aqueous fusion method of Example 1. Before fusing the anhydrous fluorides, anhydrous HF was passed over the crucible containing the $RbF-AlF_3$ mixture at room temperature so that some $RbHF_2$ would be formed. This caused HF to be liberated during the fusion and tended to hinder any thermal hydrolysis that might occur.

The mixtures were heated at 750° C. for one hour and then cooled as in Example 2. Sheets of $RbAlF_4$ were formed which were somewhat thicker, more brittle and more easily cleaved than $KAlF_4$ crystals. X-ray powder patterns confirmed their identity as $RbAlF_4$.

*General evaluation techniques.*—Dielectric measurements were accomplished by use of a General Radio Capacitance Bridge, Model 716–C, for the frequencies 100 c.p.s., 1 kc. and 10 kc. For measurement at 100 kc. and higher, a Boonton Q Meter was used.

The test sample was a capacitor consisting of two electrodes separated by a solid spacer which spacer was the potassium or rubidium fluoaluminate sheet. The capacitor was prepared either (a) by vacuum depositing gold or (b) by applying a silver paint to the opposite flat faces of the fluoaluminate sheet and drying at 200° C. for 30 minutes, thus leaving the silver metal as electrodes.

Dielectric strength values were determined on crystal pieces with non-coated or with silver coated samples. The sample in the former case was held between point contacts immersed in an oil bath. The rate of loading, in accordance with an ASTM standard, was step-wise at 500 volt/minute, 60 cycles until failure. Since the dielectric strength is expressed as volts/unit thickness, the determination of the thickness of the piece investigated is required.

A micrometer measurement of the thickness gives a value which does not reflect localized variations of thickness. Therefore, it was considered more meaningful to first conduct the experiment until failure and subsequently measure the thickness in the immediate vicinity of failure by optical methods. A microscope at a 230 magnification was used. The vertical adjustment of the focal point by a micrometer screw calibrated in microns permits the measurement of thickness in the vicinity of breakdown. The true thickness of the sample is then the linear distance between a focus on the upper and lower crystal surfaces multiplied by the index of refraction. The index of refraction of these materials was assumed to be about 1.4 which is representative of crystalline inorganic fluorine containing materials.

Both the above methods have been utilized for thickness measurements; however, for the purposes of determination of dielectric strength, the latter optical method was deemed preferable. In general, the test procedures of ASTM designation D 150–54T were followed.

The data given in the following tables represent values obtained in the above tests when using the more physically perfect fluoaluminate samples having a general absence of cracks, striations and other imperfections.

*Table I*

DIELECTRIC PROPERTIES OF $KAlF_4$ AT ROOM TEMPERATURE

| Frequency | Dielectric Constant | Dissipation Factor (%) |
|---|---|---|
| 1.32 Kc./sec. | 9.6 | 0.058 |
| 1.35 Mc./sec. | 9.0 | 0.084 |
| 4.25 Mc./sec. | 9.6 | 0.013 |
| 9.5 Mc./sec. | 9.6 | 0.027 |
| 12.2 Mc./sec. | 10.0 | 0.034 |
| 21.2 Mc./sec. | 10.0 | 0.154 |

The dielectric properties of the fluoaluminates, measured at room temperature and 60 cycles, are shown in Table II:

*Table II*

| Dielectric | Thickness | Capacitance of Test Capacitor | Dielectric Strength |
|---|---|---|---|
| $KAlF_4$ | 5 mils | 11.08 μμf | 1100 volts/mil |
| $KAlF_4$ | 8 mils | 6.9 μμf | – |
| $KAlF_4$ | 11 mils | – | 1280 volts/mil |
| $RbAlF_4$ | 11.5 mils | – | above 2000 volts/mil |

Table III shows the results of measurements at 160° C.

*Table III*

| Dielectric | Thickness | Dielectric Strength |
|---|---|---|
| $KAlF_4$ | 6 mils | 400 volts/mil |
| $RbAlF_4$ | 11.5 mils | above 500 volts/mil |

The valuable dielectric strength properties of $KAlF_4$ and $RbAlF_4$ are clearly evident from the above data. Also evident is a particular advantage of the fluoaluminates in that they may be obtained in sheets of thicknesses below 10 mils. Heretofore it has been difficult to get dielectric materials of such thicknesses. As can be seen above dielectric sheets below 10 mils are available from the potassium and rubidium fluoaluminate books of crystals.

The samples of the potassium and rubidium fluoaluminates used in the above evaluations were single crystals as obtained from the melts. However, it is also possible to hot press small pieces of the fluoaluminates as is done with synthetic mica according to the process of U.S. 2,675,853. A disc of $KAlF_4$ 0.21 mm. thick prepared by this pressing technique was evaluated at 25° C. using an electrode diameter of 8.724 mm. The data are shown in Table IV.

*Table IV*

PRESSED DISC OF $KAlF_4$

| Frequency | Capacitance (μμf) | Dielectric Constant |
|---|---|---|
| 100 cps. | 19.50 | 7.74 |
| 1 kc. | 16.30 | 6.47 |
| 10 kc. | 15.55 | 6.17 |
| 1 mc. | 14.29 | 5.69 |
| 3 mc. | 14.01 | 5.56 |

It will be understood that capacitors may be made by techniques other than painting on or vacuum plating metal electrodes. For example, metal foils of aluminum, copper, and other electrically conducting materials may be used as the electrodes which are separated by the dielectric spacer. The fluoaluminates are employed as is mica in conventional manufacturing techniques and U.S. Patents 1,345,754, 1,952,580, and 2,522,713 are illustrative of methods which may be used to make capacitors containing the fluoaluminate dielectric.

In addition to using these fluoaluminates in a capacitor as demonstrated above, they may be used in other electric and electronic applications. For example, they may be used as electrode supports in vacuum tubes, in automated electronic manufactured articles employing wafer dielectrics for micromodule systems, in motor armature insulation, in high-voltage generator insulation in the form of tape fabricated from flakes of the fluoaluminate bonded to a backing, as dielectric insulators in switches, microswitches, relays, transformers, wires and cables, coaxial cables, and the like and in many electrical applications where dielectrics are generally used. In addition, the potassium and rubidium fluoaluminates may be employed in place of glass as a binder for natural and synthetic mica used in pressed dielectrics. In this application they will have the advantage supplementing the dielectric properties of the mica rather than adversely affecting the dielectric properties of the mica as does glass.

Many changes will be obvious to the skilled artisan and may be made from the above description of the invention without departing from its spirit and scope.

I claim:
1. Articles of manufacture containing an electrical conductor insulated with a solid dielectric wherein said dielectric is a crystalline sheet-like fluoaluminate selected from the group consisting of $KAlF_4$ and $RbAlF_4$.

2. Articles of manufacture according to claim 1 wherein the dielectric is a pressed sheet obtained by pressing crystals of said fluoaluminate.

3. A capacitor comprising a pair of metal electrodes and a solid spacer therebetween, said spacer consisting essentially of a sheet-like fluoaluminate selected from the group consisting of $KAlF_4$ and $RbAlF_4$.

4. The capacitor of claim 3 wherein the dielectric is $KAlF_4$.

5. The capacitor of claim 3 wherein the dielectric is $RbAlF_4$.

References Cited in the file of this patent

Brosset: Z. Anorg. Allg. Chem., 239, 1938, pp. 301–304.